United States Patent [19]

Wiacek et al.

[11] Patent Number: 4,537,841
[45] Date of Patent: Aug. 27, 1985

[54] METAL-SUPPORTED SEALS FOR GALVANIC CELLS

[75] Inventors: Marian Wiacek; Charles Markin; Ronald J. Book, all of Toronto, Canada

[73] Assignee: Duracell Inc., Bethel, Conn.

[21] Appl. No.: 548,740

[22] Filed: Nov. 4, 1983

[51] Int. Cl.³ .............................................. H01M 2/00
[52] U.S. Cl. ..................................... 429/56; 429/174; 429/185; 429/82
[58] Field of Search .................... 429/82, 86, 165, 166, 429/171, 174, 180, 181, 185, 54, 56, 172, 173

[56] References Cited

U.S. PATENT DOCUMENTS

| | | | |
|---|---|---|---|
| 3,314,824 | 4/1967 | Spanur | 429/56 |
| 3,318,737 | 5/1967 | Watanabe et al. | 429/172 |
| 4,075,398 | 2/1978 | Levy | 429/56 |

Primary Examiner—Anthony Skapars
Attorney, Agent, or Firm—Ronald S. Cornell; Israel Nissenbaum

[57] ABSTRACT

In a sealed cell having an anode, a cathode, and a cylindrical can into which the principal components of the cell are assembled, a sealing and insulating member (seal) is provided at the open end of the can, and is held in sealing relationship with the can by a crimp formed over the top edge thereof. The seal may be formed so as to have a downwardly depending skirt in its lower portion; generally in the manner of a plurality of leg-like projections, usually three. Across the upper surface of the member, and over an upwardly directed and centrally located nail boss in the upper surface, there is placed a metal disc having a centrally located opening which is in interference fit with the outside periphery of the nail boss, and having a passage formed therein for pressure equalization of the space between the plastic body and the metal disc to the outside of the cell. There is an upwardly extending skirt formed around the outer periphery of the member. The seal and insulating member may be snap-fitted into either a stepped can or a beaded can.

22 Claims, 6 Drawing Figures

METAL-SUPPORTED SEALS FOR GALVANIC CELLS

FIELD OF THE INVENTION

This invention relates to sealed galvanic cells, such as primary alkaline cells and others, and particularly relates to a sealing and insulating member, hereinafter referred to as seals, for such cells. A seal according to the present invention may have a snap-in fitment to the cathode can for the cell, and may have a rupturable vent membrane formed therein, as required. Over the upper surface of the seal there is a metal disc, whose purpose, among others, is to serve to assure that a peripheral grommet or skirt portion of the plastic component of the sealing and insulating member is maintained in place as a gasket between the outer periphery of the disc and the inside surface of the can, thereby so as to maintain the seal within the can during and after temperature cycling. The disc is in interference, or "snap-in" fit with the nail boss formed in the upper surface of the sealing and insulating member. Other purposes for the disc include the ability to absorb crimping forces, and to serve as a safety shield above the vent membrane.

BACKGROUND OF THE INVENTION

The general construction of a sealed, cylindrical cell is such that its principal components, an anode and a cathode, are assembled into a can, together with the appropriate separators, electrolyte, etc, and the cell is then closed by a seal placed in the open end of the can. The seal precludes electrolyte leakage from the cell, and insulates the electrode contacts of the cell from each other.

A seal will desirably also permit hydrogen gas permeation from the cell so as to reduce pressure build-up within the cell, and yet also to inhibit moisture gain or loss, and oxygen or carbon dioxide infiltration into the cell. Still further, the seal is usually manufactured with a molded-in membrane or thin section so as to assure that the cell will vent under certain conditions when high gas pressure buildup within the cell may occur, and to preclude rupture of the cell.

The ability of sealing and insulating members to serve the purposes and functions of sealing and insulating sealed galvanic cells, may be very often determined simply by appropriate testing methods, whereby a number of cells may be subjected to discharge and charging tests, short circuit tests, temperature cycling, high or low temperature longlife storage testing, and so on. Some seals may pass certain of the tests very well, but be somewhat less consistent on other tests; and although nearly all of the tests are quite extreme, they are indicative of the kinds of use and abuse conditions that may exist in the field. Many commercially used sealing and insulating members for cells have passed many tests, but the provision of sealing and insulating members that can pass all of the tests consistently, and at the same time permit installation of more active material in the cell, provides greater assurance of consistent performance in the field. Moreover, as will be discussed hereafter, considerable economies of supply and manufacture may be effected by the present invention.

The present invention is directed toward seals which may be snap-fitted or snap-fittable when placed in cells with assurance that they will remain in place, even on high speed cell assembly lines. Moreover, the present invention provides seals that are supported by a metal disc, providing a stronger structure, and which may be easily and inexpensively manufactured, and also which provide for the placement of greater amounts of active material in the cell so as to have longer shelf and/or service life.

The prior art includes Daley et al U.S. Pat. No. 3,068,312 issued Dec. 11, 1962, who teach a sealed cell having a conductive container cover which may be metallic and which is fitted into a sealing member having a diaphragm through which a current collect passes. The current collector contacts the underside of the conductive cover. Feldhake, U.S. Pat. No. 3,713,896, issued Jan. 30, 1973, teaches a cell having a cover member where a seal is effected by coating at least a surface of the rim of the member with a resin, and which requires either a spring or a welded member on the underside of the cover member for current collection. Spanur, U.S. Pat. No. 3,802,923, issued Apr. 9, 1974, simply teaches a dry cell having a resealable vent closure which comprises a disc-like cover fitted over the open end of the cell can and including a resilient flapper valve member which is formed at the outer portion of the cover. Decker et al, U.S. Pat. No. 3,994,749, issued Nov. 30, 1976 teach a vent valve for cells including the cover plate for the internal structure of the cell having a central relief apperture. A vent cap is affixed to the cover plate, having one or more vent ports, and a resilient seal is provided between the vent cap and the cover plate to control the release of gasses. Levy, U.S. Pat. No. 4,191,806, issued Mar. 4, 1980, relies on a disc of resilient plastic, with a pressure vent which is a recess having a frangible diaphragm. The Levy structure has no support disc, and requires a mechanically induced stress failure for venting. Hooke et al, in U.S. Pat. No. 4,271,241, issued June 2, 1981, teach a resealable pressure relief vent valve which includes an outer rigid plate and an inner flexible disc which forms part of the interior of the cell can. The disc has one or more vent holes, and there is a compressible rubber disc in partially compressed condition placed between the outer rigid plate and the inner flexible disc and situated over any of the vent holes so as to vent the interior of the cell when the inner flexible disc has flexed upwardly breaking its seal over the holes. One of the principal features of the present invention is to provide a seal that may be fitted to both stepped cell cans and beaded cans, as they may be supplied and manufactured in different regions and in different countries,—and from different can manufacturers—but where the internal assembly of active components is essentially the same.

It is also a purpose of the present invention to provide a design for seals, especially when they are produced from a thermoplastic material such as polypropylene, which permits permeation of hydrogen gas from the cell even when it is in an upside-down position—that is, with the seal in the downmost position.

A further purpose of the invention is to provide such seals in order to assure a good compression force of the member against the inside of the can, so as to even better assure that the cell is well sealed at the crimp.

Safety considerations are also kept in mind by the provisions of the present invention, including safety against outward expulsion of active material in the event of an abrupt vent rupture, and safety against inward intrusion of foreign objects that should not otherwise enter the cell.

BRIEF DESCRIPTION OF THE DRAWINGS

These, and other purposes and advantages of the present invention, are discussed hereafter, in association with the accompanying drawings, in which.

DESCRIPTION OF THE PREFERRED EMBODIMENT

As noted, the present invention relates to cylindrical sealed cells, in which an anode, cathode, separators, electrolyte, etc., are assembled into a can—usually the cathode can when an alkaline cell is considered. The can has a closed end and an open end, and the open end may be either stepped or beaded.

When the can is stepped at its open end, the diameter of the can above the step is greater than that below. When the can is beaded, there is an inwardly extending bead where the diameter of the bead is less than that of the rest of the can.

Figure 1:
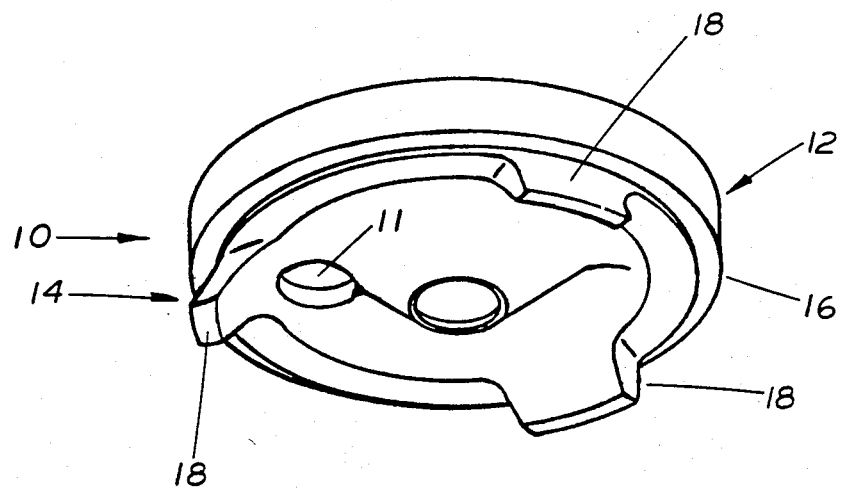
FIG. 1 is a perspective view of a typical seal according to the present invention, when viewed from below.

A purpose of the present invention, as above stated, is to provide a seal that may be snap-fitted into the open end of the can, whether it is stepped or beaded. A general but typical view of a seal according to the present invention is shown in FIG. 1, where the member 10 is provided having an upper portion 12 and a lower portion 14. Generally, the upper portion 12 has a diameter which is substantially the same as that of the greater part of the can. Formed in the seal 10 is a shoulder 16 in the outer periphery of the member, and the shoulder is inwardly directed so as to have a diameter whichis less than that of the greater part of the can into which the member is fitted.

In order to assure a snap-fitment of the member 10 into a can, the lower portion 14 is formed as a downwardly and outwardly extending skirt, with the maximum diameter—or the maximum developed diameter—of the skirt portion 14 being located substantially at the lowest extremity thereof. That diameter is substantially as large as that of the greater part of the can into which the member is to be fitted, at least before the member is installed or fitted into the can.

As discussed in greater detail hereafter, it is more usual according to the present invention that the lower portion or skirt be formed with a plurality of downwardly extending leg-like projections, shown generally at 18 in FIG. 1. In preferred embodiments, the number of leg-like projections 18 is three, but it may be more.

Thus, during assembly of sealed cells using high speed manufacturing processes, the sealing and insulating member 10 is installed into the open end of the can, sometimes at a station and a time during the manufacturing process that is distantly removed in time and location from the place where the crimp in the top of the can will be made. During that period of time, however, it is desireable that there should be little or no electrolyte loss from the can; and moreover, that the sealing and insulating member should not become dislodged particularly as it moves along a high speed, vibrating, assembly line. The snap-fitment of the member into the can, either stepped or beaded, is urged due to the downwardly and outwardly extending skirt in lower portion 14, or the legs 18, beneath the shoulder 16.

On the other hand, it is also possible that seals according to the present invention may be formed without the downwardly depending skirt, by which the snap-fitment of the seal into the can is less assured, but which may be particularly useful for assembly into stepped cans, without departing from the other purposes of a supported seal as discussed herein.

In keeping with the general provisions of the present invention, the seal 10 may be formed from such materials as polypropylene, polyethylene, and nylon, and copolymers thereof.

As shown more particularly in FIGS. 2 to 6, the upper surface of any configuration of the seal 10 has a centrally located upwardly extending nail boss formed therein, and an upwardly extending skirt that is formed around the outer edge of the outer surface. A metal disc having a central opening therein, is fitted over the centrally located nail boss, and over the upper surface of the sealing and insulating member 10, so that a centrally located opening in the metal disc is generally in interference fit with the outside or a substantial portion of the outside periphery of the nail boss. The outside periphery of the disc is not in interference fit with the inside of the upwardly extending skirt near the lowest portion thereof.

Figure 2:
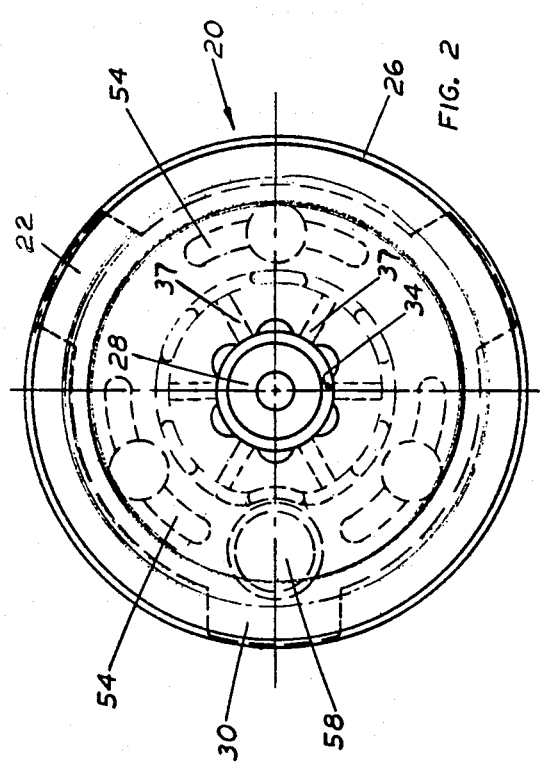
FIG. 2 is a plan view from the top of a typical seal, such as is used in larger cells, showing other features of the structure in dotted or chain line.
Figure 3:
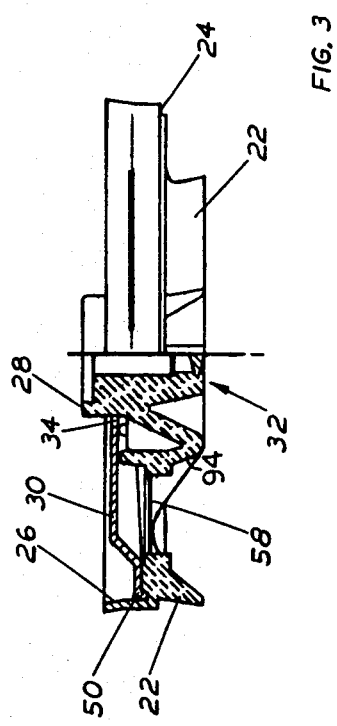
FIG. 3 is a side view, partially in cross-section, of the structure of FIG. 2.

For example, referring particularly to FIGS. 2 and 3, an embodiment of a seal of the sort that may particularly be used in D sized alkaline cells is shown. That member 20 is formed having three downwardly extending legs 22, beneath the shoulder 24, and having an upwardly extending skirt 26 around the outer periphery of the member above its upper surface. A centrally located nail boss 28 is formed in the upper surface, which is used for receiving and supporting the anode nail when it is placed in the cell. A metal disc 30 is placed over the upper surface of the molded plastic portion 32 of the member 20, so that an opening 34 formed in the disc 30 is in interference fit with the boss 28.

In a preferred embodiment of the seal, the central opening 34 is formed with a plurality of tooth-like projections 37, not only to assure that the disc has a gripping interference with the nail boss 28, but also to provide for a greater venting area for the escape of hydrogen gas from the cell, as discussed hereafter. The toothed opening further assures a more positive "snap-on" loading of the disc onto the plastic member.

Figure 4:
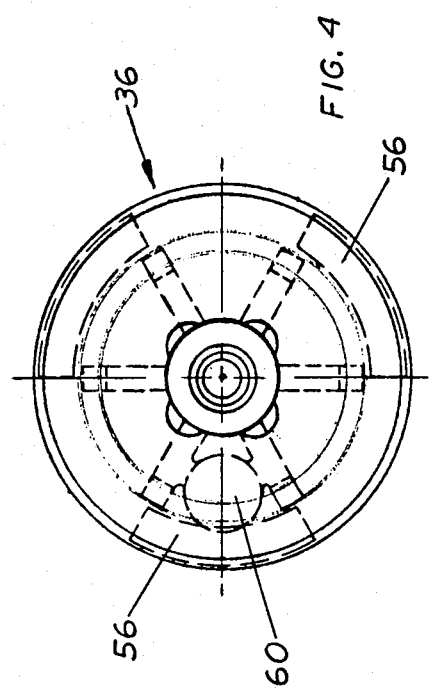
FIGS. 4 and 5 are views similar to FIGS. 2 and 3, but of a structure used in smaller sized cells.
Figure 5:
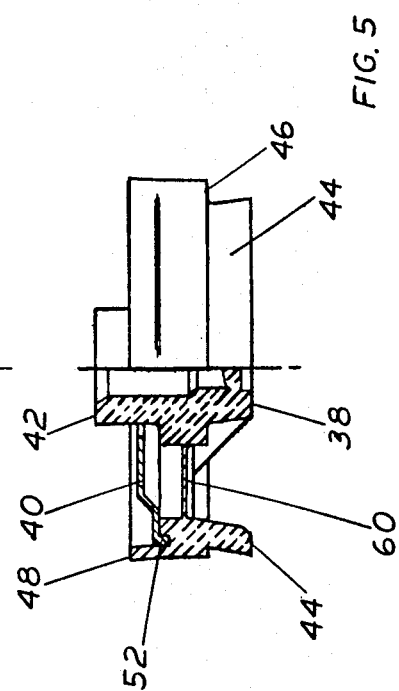

The embodiment of FIGS. 4 and 5 comprises a seal 36 which has a molded plastic portion 38 and a metal disc 40 placed over the nail boss 42. Legs 44 are formed in the lower portion of the seal 36, beneath the shoulder 46. An upwardly extending skirt 48 is formed above the upper surface of the plastic component 38 at the outer periphery of the seal 36.

In either of the embodiments of FIGS. 2 and 3 or FIGS. 4 and 5, the upwardly directed skirts 26 or 48 are generally, as shown, tapered slightly upwardly and outwardly. A taper of the upwardly directed skirts provides a lead-in for more easily mechanically placing the disc over the nail boss for snap-on fitment thereto.

Also, as shown, the outer periphery of the metal disc 30 or 40 is generally formed so as to have a downwardly directed rim 50 or 52, respectively. The downwardly directed rim at the outer periphery of the metal disc particularly assures that, when the seal is in place in a crimped cell, there shall be no cutting of the plastic gasket formed by the upwardly directed skirt of the outer periphery of the plastic portion of the seal by the outer periphery of the metal disc.

Likewise, the lower surface of the discs 30 or 40 may be supported above the upper surface of the plastic bodies 32 or 38 by at least one or a plurality of discontinuous bosses or ledges such as those that are shown at 54 or 56. The ledges are formed in the upper surface of the respective plastic components, and are spaced from the respective central bosses and from the respective upwardly extending skirts.

Still further, the downwardly directed rims 50 or 52 are generally received in recesses that are formed in the upper surface of the respective plastic bodies 32 or 38, at the bases of the respective upwardly extending skirts 26 or 48.

In any of the seals, there is usually formed at a place other than at the centre or outer periphery, a membrane which is intended to rupture at a predetermined level if the pressure of gas within the sealed cell reaches that level. The membranes are variously shown in members 10, 20 and 36 at 11, 58 and 60, respectively.

Figure 6:
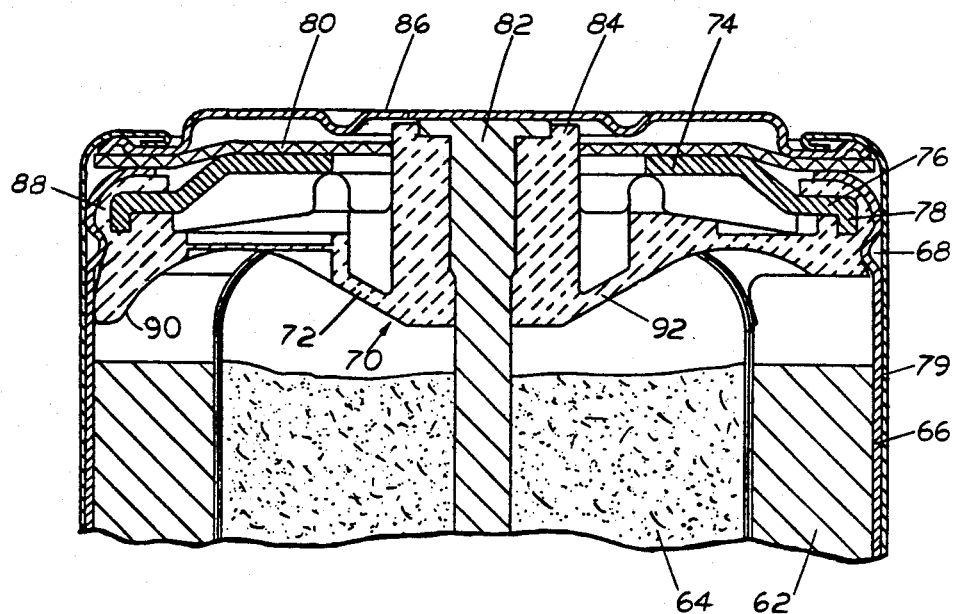
FIG. 6 is a cross-sectional view of the top portion of an assembled (except for the outer jacket) cell embodying the present invention.

Referring now to FIG. 6, a typical assembly of an alkaline cell is shown, where a cathode material 62 and an anode material 64 are installed in a cathode can 66. Near the top of the cathode can 66 is an inwardly extending bead 68. The can may also have been formed having a stepped portion near the open end thereof. A crimping seal of the can against the sealing and insulating member, in the manner shown, is assured.

The seal 70 comprises a plastic body 72 and a metal disc 74. It will be noted that the outer portion 76 of the disc 74 has a downturned rim 78, which has been received in a recess formed in the plastic member 72. The assembly of FIG. 6 is shown complete with its outer jacket 79, which includes a kraft or other insulating washer 80, an anode nail 82 driven down through the nail boss 84, and an anode cap 86 over the top portion of the assembly.

The crimp is formed above the bead 68 at 88, and generally it is such so that the crimping forces stress the plastic material to an amount greater than the elastic limit of the material, at least at a first portion usually right at the crimp, and so that at least a second portion usually below the crimp is stressed to an amount less than the elastic limit of the material.

As stated, and as can be seen particularly from FIG. 6, the metal support disc 74, especially when downturned at 76 to form a rim 78, forms a good solid support against which the upstanding skirt portion of the seal member may be compressed, so as to form a seal during the cell crimping operation. Also, especially when the disc is formed having tooth-like projections as shown in FIG. 2, a positive lock or gripping interference of the disc to the nail boss is assured.

It will also be seen that the legs 90 formed in the lower portion of the sealing member 70 assure the snap-in fitment of the member into the can 66.

The configuration of the metal disc 74 is such that it has a higher elevation in its central portion than at its periphery, as are the metal discs of the embodiments of FIGS. 2 and 3 or 4 and 5, so that when crimping pressure is applied against the upper edge of the open cathode can, it is assured that there will be no downward deflection of the sealing and insulating member. Moreover, the configuration of any of the metal discs is such that there is a springiness of the disc, which allows for the outer periphery of the disc to exert an outwardly directed compressive force against the inside surface of the respective upwardly directed skirt, after the inwardly directed crimping forces that are generated during the crimping operation are released after the crimped cell is removed from the crimping die.

Because of the presence of the metal support disc, it is possible to keep the cross-section of the injection molded plastic portion of the seal to a minimum practical thickness, consistent with the cell size into which the sealing member will be assembled. When the plastic body portion is such as polypropylene, hydrogen permeation is permitted not only through the rupturable vent membrane, but through the entire body, so that hydrogen permeation may be maximized in any position that the cell may be held or stored, during usage or abuse, or storage; and especially when the member is formed with a relatively thin radially directed protrusion 92 around the nail collector boss 84 as shown in FIG. 6, or as shown at 94 in FIG. 3. Even when the cell is upside down, if there is any loose electrolyte in the cell which drains out of the cathode or anode material or separator, it will lie on the inside—then the upper side—of the plastic body portion, which is configured in such a manner that a protrusion or at least a portion of it is above the liquid electrolyte. Such a configuration thereby allows for unrestricted diffusion and permeation of hydrogren out of the cell, no matter in what position the cell may be placed. Indeed, the presence of the metal support disc in any embodiment according to the present invention makes possible the use of thin-section thermoplastic material, particularly such as polypropylene, thereby even more greatly enhancing the possible hydrogren-diffusion characteristics of the cell and the increased interior volume, without compromise of the strength of the closure member for the cell and the strength of the crimp as well as the integrity of the seal formed by the crimp.

[This is in contradistinction to the teachings of U.S. Pat. No. 3,218,197, Carmichael et al, issued Nov. 16, 1965, which teaches a plastic top for a cell having a cavitated protrusion, but which permits hydrogren permeation only through a molded thin membrane portion of the plastic top.]

From FIG. 6, as well as from FIGS. 3 and 5, it will be seen that the metal disc acts as a safety shield above the rupturable vent membrane. This is, of course, always an important factor when it is considered that occasionally a foreign object might intrude into the region of the vent membrane, with the risk of piercing it and expulsion of active material through the vent.

By the same token, the space or volume between the upper surface of the plastic body portion of any seal according to the present invention, and its metal disc, allows for rapid gas expansion if the cell vents, so that the gas will not escape at high velocity from the top portion of the cell. There is a passage through the metal disc to allow pressure equalization between the space and the outside of the cell; and especially when the tooth-like protrusions are provided in the central opening of the disc around the central boss of the plastic body, a plurality of passages are provided.

Especially when the plastic body portion is a thermoplastic, such as polypropylene, lower headroom may be provided above the membrane, so that the total thickness of the sealing and insulating member may be somewhat reduced. This, together with the provision of the leg-like projections in the skirt of the plastic body portion, or their elimination in certain instances, allows for a greater internal free volume within the cell, so that a greater amount of active material may be installed in the cell. This gives the cell a longer shelf and/or service life, and/or allows for a greater gas expansion volume within the cell under high discharge conditions.

Analysis of a great number of different designs of sealing and insulating members according to the present invention, each comprising a molded plastic body of material such as polypropylene, and having a metal disc fitted to the plastic body, reveals that in each instance the cost of production of such a sealing and insulating member is no greater—and is usually less—than the cost of molded nylon sealing and insulating members as referred to in the prior art.

The seals of the present invention may be annealed or, at least in certain instances such as small cells intended for general use applications, the plastic body portions do not need to be annealed, and yet good cell performance is assured.

The embodiments illustrated in the accompanying Figures are used for illustrative purposes only, the scope of the invention being defined by the accompanying claims.

What is claimed is:

1. In combination, a cylindrical sealed galvanic cell, having an anode, a cathode, and a generally cylindrical can into which the principal components of the cell are placed, said can having a closed end and an open end; and further comprising a sealing and insulating member at the open end of said can, said member being held in sealing relationship to said can by a crimp formed at the top edge of said can; where:

said sealing and insulating member comprises a molded thermoplastic body portion and a metal disc portion over said thermoplastic body portion, with a space between said disc and said thermoplastic body;

said molded thermoplastic body portion has an inwardly directed shoulder in its periphery subtended by a downwardly and outwardly extending discontinuous skirt portion, which is formed as a plurality of discrete leg-like projections; and said metal disc has a central opening therein and has an interference fit over a centrally located upwardly extending boss in the upper surface of said thermoplastic body portion, and has at least one opening formed therein to provide a passage for pressure equalization between the outside of said cell and the space between said disc and said molded thermoplastic body.

2. In combination, a cylindrical sealed galvanic cell, having an anode, a cathode, and a generally cylindrical can into which the principal components of the cell are placed, said can having a closed end and an open end; and further comprising a sealing and insulating member at the open end of said can, said member being held in sealing relationship to said can by a crimp formed at the top edge of said can; where:

said sealing and insulating member comprises a molded thermoplastic body portion and a metal disc portion over said thermoplastic body portion, with a space between said disc and said thermoplastic body; and said metal disc has a central opening therein formed with a plurality of spaced radially inwardly directed projections fitted with the central opening of said projections in interference fit over a centrally located upwardly extending boss in the upper surface of said thermoplastic body portion; wherein the openings between said projections provide a passage for pressure equalization between the outside of said cell and the space between said disc and said molded thermoplastic body.

3. The assembly of claim 1, wherein said can is formed having a stepped portion near the open end thereof, the diameter of said can above the step being greater than that below.

4. The assembly of claim 1, where said can is formed with an inwardly extending bead formed near the open end thereof.

5. The assembly of claim 2, where the central area of said disc is higher than the periphery thereof.

6. The assembly of claim 5, where there is an upwardly extending skirt around the outer edge of said upper surface of said molded thermoplastic body.

7. The assembly of claim 1, where there are at least three leg-like projections below said shoulder.

8. The assembly of claim 6, where at least one portion of said molded thermoplastic body, other than at its centre or outer periphery, is formed with a thickness less than that of the surrounding material thereof so as to provide a rupturable vent area of said molded thermoplastic body in the event that pressure within said sealed galvanic cell reaches a predetermined level.

9. The assembly of claim 8, where at least a first portion of the thickness of the peripheral material of said molded thermoplastic member is stressed by the crimp formed at said open end to an amount greater than the elastic limit of the material thereof, and at least a second portion of the thickness of the peripheral material of said molded thermoplastic member is stressed by said crimp to an amount less than the elastic limit of said material.

10. The assembly of claim 8, where there is a springiness of the disc such that, after the release of inwardly directed crimping forces forming said crimp, there is an outwardly directed compressive force around the periphery of said disc against the inside surface of said upwardly extending skirt.

11. The assembly of claim 8, where the outer periphery of said molded thermoplastic member at the outer side of said upstanding skirt tapers slightly upwardly and outwardly.

12. The assembly of claim 11, where the inner and outer peripheries of said molded thermoplastic member each taper slightly upwardly and outwardly.

13. The assembly of claim 8, where the outer periphery of said metal disc is formed in a downwardly directed rim.

14. The assembly of claim 13, where said downwardly directed rim of said metal disc is received in a recess formed in the upper surfaces of said molded thermoplastic member at the base of said upwardly extending skirt.

15. The assembly of claim 1, where the material from which said molded thermoplastic member is formed is chosen from the group consisting of polypropylene, polyethylene, nylon, and co-polymers thereof.

16. The assembly of claim 8, where the material from which said molded thermoplastic member is formed is chosen from the group consisting of polypropylene, polyethylene, nylon, and copolymers thereof.

17. The assembly of claim 16, where said material is polypropylene.

18. The assembly of claim 8, where at least one protrusion is formed in the underside of said molded thermoplastic member and is radially directed away from a downward extension of said centrally located boss, and has a thickness greater than that of said rupturable vent area.

19. In combination, a cylindrical sealed galvanic cell, having an anode, a cathode, and a generally cylindrical can into which the principal components of the cell are placed, said can having a closed end and an open end; and further comprising a sealing and insulating member at the open end of said can, said member being held in sealing relationship to said can by a crimp formed at the top edge of said can; where:

said sealing and insulating member comprises a molded thermoplastic body portion and a metal disc portion over said thermoplastic body portion, with a space between said disc and said thermoplastic body; and said metal disc has a central opening therein formed with a plurality of spaced radially inwardly directed projections fitted with the central opening of said projections in interference fit over a centrally located upwardly extending boss in the upper surface of said thermoplastic body portion; wherein the openings between said projections provide a passage for pressure equalization between the outside of said cell and the space between said disc and said molded thermoplastic body; where the central area of said disc is higher than the periphery thereof; where there is an upwardly extending skirt around the outer edge of said upper surface of said molded thermoplastic body; where at least one portion of said molded thermoplastic body, other than at its center or outer periphery, is formed with a thickness less than that of the surrounding material thereof so as to provide a rupturable vent area of said molded thermoplastic body in the event that pressure within said sealed galvanic cell reaches a predetermined level; and where the lower surface of said disc is supported above the upper surface of said molded thermoplastic body by at least one ledge formed in said upper surface and spaced away from said central boss and away from said upwardly extending skirt.

20. In combination, a cylindrical sealed galvanic cell, having an anode, a cathode, and a generally cylindrical can into which the principal components of the cell are placed, said can having a closed end and an open end; and further comprising a sealing and insulating member at the open end of said can, said member being held in sealing relationship to said can by a crimp formed at the top edge of said can; where:

said sealing and insulating member comprises a molded thermoplastic body portion and a metal disc portion over said thermoplastic body portion, with a space between said disc and said thermoplastic body; and said thermoplastic body portion has an inwardly directed shoulder at its periphery subtended by a downwardly and outwardly extending discontinuous skirt portion, which is formed as a plurality of discrete leg-like projections; and said metal disc has a central opening therein formed with a plurality of spaced radially inwardly directed projections fitted with the central opening of said projections in interference fit over a centrally located upwardly extending boss in the upper surface of said thermoplastic body portion;

wherein the openings between said projections provide a passage for pressure equalization between the outside of said cell and the space between said disc and said molded thermoplastic body.

21. The assembly of claim 20 wherein there is an upwardly extending skirt around the outer edge of said upper surface of said molded thermoplastic body and wherein the outer periphery of said metal disc is formed in a downwardly directed rim which is received in a recess formed in the upper surface of said molded thermoplastic member at the base of said upwardly extending skirt.

22. The assembly of claim 21 wherein at least one portion of said molded thermoplastic body, other than at its center or outer periphery, is formed with a thickness less than that of the surrounding material thereof so as to provide a rupturable vent area of said molded thermoplastic body in the event that pressure within said galvanic cell reaches a predetermined level.

* * * * *